United States Patent [19]

Tanaka et al.

[11] 4,226,964

[45] Oct. 7, 1980

[54] PROCESS FOR POLYMERIZING OLEFIN

[75] Inventors: Toru Tanaka, Komae; Shigeaki Okano, Yamato; Eiji Tanaka, Kawasaki, all of Japan

[73] Assignee: Mitsubishi Chemical Industries Ltd., Tokyo, Japan

[21] Appl. No.: 6,386

[22] Filed: Jan. 25, 1979

[30] Foreign Application Priority Data

Feb. 23, 1978 [JP] Japan .................................. 53-20148
Oct. 17, 1978 [JP] Japan .................................. 53-127507

[51] Int. Cl.$^2$ .......................... C08F 4/02; C08F 10/02
[52] U.S. Cl. .................................. 526/114; 252/429 B; 252/429 C; 526/124; 526/352
[58] Field of Search .......................................... 526/114

[56] References Cited

U.S. PATENT DOCUMENTS 4,109,071 8/1978 Berger et al. ......................... 526/114

Primary Examiner—Edward J. Smith
Attorney, Agent, or Firm—Oblon, Fisher, Spivak, McClelland & Maier

[57] ABSTRACT

In a process for polymerizing an olefin in the presence of a catalyst system combining an organoaluminum compound with a hydrocarbon insoluble solid catalytic component prepared by treating a hydrocarbon solution containing a magnesium compound, a titanium compound and a zirconium compound with an aluminum halide having the formula $$AlR^1X_2^1$$

($R^1$ represents an alkyl, aryl or cycloalkyl group and $X^1$ represents a halogen atom), an improvement characterized in that the magnesium compound is a compound having the formula $$Mg(OR^2)_lX_{2-l}^2$$

($R^2$ represents an alkyl, aryl or cycloalkyl group; $X^2$ represents a halogen atom; and $l$ is 1 or 2) and the titanium compound is a compound having the formula $$Ti(OR^3)_nX_{4-n}^3$$

($R^3$ represents an alkyl, aryl or cycloalkyl group; $X^3$ represents a halogen atom; n is 1, 2 or 3) and the zirconium compound is a compound having the formula $$Zr(OR^4)_mX_{4-m}^4$$

($R^4$ represents an alkyl, aryl or cycloalkyl group; $X^4$ represents a halogen atom; m is 1, 2 or 3) or an alcohol solution of a compound having the formula $$ZrX_4^4$$

($X^4$ is defined above).

17 Claims, No Drawings

PROCESS FOR POLYMERIZING OLEFIN

BACKGROUND OF THE INVENTION

1. FIELD OF THE INVENTION

The present invention relates to a process for polymerizing an olefin. More particularly, it relates to a process for polymerizing an olefin in the presence of a novel catalyst system comprising a titanium compound and a zirconium compound.

2. DESCRIPTION OF THE PRIOR ART

It has been proposed to prepare a polyolefin having a wide molecular weight distribution using a catalyst system comprising a titanium compound and a zirconium compound. For example, it has been proposed to use a catalyst system comprising triisobutylaluminum and a catalytic component obtained by reacting magnesium metal, an alcohol, titanium tetraalcoholate, and zirconium trichloride in Japanese Patent Publication No. 46387/1976, and a catalyst system comprising triisobutylaluminum and a catalytic component obtained by reacting magnesium diethoxide, titanium tetraalcoholate or titanium tetrachloride and zirconium tetraalkoxide or zirconium tetrachloride in Japanese Unexamined Patent Publication No. 138785/1976.

When an olefin is polymerized in the presence of such catalyst system, a polyolefin having a wide molecular weight distribution and an improved processability can be obtained, however, the characteristics are not satisfactory.

On the other hand, in order to prepare a polyolefin having a wide molecular weight distribution and an improved processability by a process of elimination of a catalyst residue separation step, it is required to use a catalyst system having high activity of the catalyst. That is, when the activity of the catalyst is high, the catalyst residue in the resulting polymer is small and a polyolefin having high quality is obtained. However, in order to attain high activity of the catalyst by using the conventional catalyst system, the processability of the resulting polyolefin is inferior and it requires a long polymerization time and high polymerization pressure to reduce productivity and it requires to use a polymerization reactor having high pressure durability.

The inventors have studied on these problems and have found that a polyolefin having a wide molecular weight distribution and an improved processability can be obtained by using a catalyst system comprising a specific titanium compound and a specific zirconium compound in high productivity and high activity of the catalyst under a condition of non-requirement durability of a polymerization reactor. The present invention has been attained by the finding.

SUMMARY OF THE INVENTION

It is an object of the present invention to prepare a polyolefin having a wide molecular weight distribution and an improved processability.

It is another object of the present invention to polymerize an olefin in the presence of a catalyst system having high activity of the catalyst to prepare a polyolefin which can be used without a catalyst residue separation in high productivity, in a polymerization reactor having relatively low pressure durability.

The foregoing and other objects of the present invention have been attained by providing a process for polymerizing an olefin in the presence of a catalyst system combining an organoaluminum compound with a hydrocarbon insoluble solid catalytic component prepared by treating a hydrocarbon solution containing a magnesium compound, a titanium compound and a zirconium compound with an aluminum halide having the formula $$AlR^1X^1_2$$

($R^1$ represents an alkyl, aryl or cycloalkyl group and $X^1$ represents a halogen atom,) wherein the magnesium compound is a compound having the formula $$Mg(OR^2)_l X^2_{2-l}$$

($R^2$ represents an alkyl, aryl or cycloalkyl group; $X^2$ represents a halogen atom; and l is 1 or 2) and the titanium compound is a compound having the formula $$Ti(OR^3)_n X^3_{4-n}$$

($R^3$ represents an alkyl, aryl or cycloalkyl group; $X^3$ represents a halogen atom; n is 1, 2 or 3) and the zirconium compound is a compound having the formula $$Zr(OR^4)_m X^4_{4-m}$$

($R^4$ represents an alkyl, aryl or cycloalkyl group; $X^4$ represents a halogen atom; m is 1, 2 or 3) or an alcohol solution of a compound having the formula $$ZrX^4_4$$

($X^4$ is defined above).

DETAILED DESCRIPTION OF THE PREFERRED EMBODIMENTS

The magnesium compound is a compound having the formula $$Mg(OR^2)_l X^2_{2-l}$$

($R^2$ represents an alkyl, aryl or cycloalkyl group; $X^2$ represents a halogen atom; and l is 1 or 2).

Suitable magnesium compounds include the magnesium compounds having the formula wherein $R^2$ is an alkyl, aryl or cycloalkyl group having 1 to about 15 of carbon atoms such as methyl, ethyl, propyl, butyl, pentyl, hexyl, octyl, phenyl, tolyl, xylyl, and cyclohexyl groups; and $X^2$ is chlorine, bromine or iodine atom for example, dimethoxymagnesium, diethoxymagnesium, ethoxymagnesium chloride and diphenoxymagnesium. It is especially preferable to use the magnesium compound having the formula wherein l is 2. The titanium compound is a compound having the formula $$Ti(OR^3)_n X^3_{4-n}$$

($R^3$ represents an alkyl, aryl or cycloalkyl group; $X^3$ represents a halogen atom; n is 1, 2 or 3).

In the formula, typical $R^3$ and $X^3$ are respectively the same with those of $R^2$ and $X^2$.

Suitable titanium compounds include diethoxytitanium dichloride, di-n-propoxytitanium dichloride, di-n-butoxytitanium dichloride as n=2; and triethoxytitanium monochloride, tri-n-propoxytitanium monochloride and tri-n-butoxytitanium monochloride as n=3 and ethoxytitanium trichloride as n=1.

It is preferable to use the titanium compound having the formula wherein n is 3 or 2 especially n is 3.

The zirconium compound is a compound having the formula $$Zr(OR^4)_n X_{4-m}^4$$

($R^4$ represents an alkyl, aryl or cycloalkyl group; $X^4$ represents a halogen atom; and m is 1, 2 or 3) or an alcohol solution of a compound having the formula $$ZrX_4^4$$

($X^4$ is defined above).

In the formula, typical $R^4$ and $X^4$ are respectively the same with those of $R^2$ and $X^2$.

Suitable zirconium compound include monoethoxyzirconium trichloride and mono-n-butoxyzirconium trichloride as m=1; and diethoxyzirconium dichloride and di-n-butoxyzirconium dichloride as m=2; and triethoxyzirconium monochloride, tri-n-propoxyzirconium monochloride, triisopropoxyzirconium monochloride and tri-n-butoxyzirconium monochloride as m=3.

The zirconium compound having the formula $$ZrX_4^4$$

include zirconium tetrachloride and alcohols used as solvent include ethanol, n-propanol, n-butanol, n-pentanol and n-octanol.

It is preferable to use an alcohol solution of zirconium tetrachloride or the compound having m=3 such as triethoxyzirconium monochloride, tri-n-butoxyzirconium monochloride and tri-isopropoxyzirconium monochloride.

In the process of the present invention, a hydrocarbon solution containing the magnesium compound, the titanium compound and the zirconium compound is prepared.

Suitable hydrocarbons used as solvents include aliphatic hydrocarbons such as hexane and heptane; alicyclic hydrocarbons such as cyclohexane, especially aromatic hydrocarbons such as benzene, toluene and xylene.

In the preparation of the hydrocarbon solution, the magnesium compound, the titanium compound, and the zirconium compound are preferably mixed to form a homogeneous solution. Sometimes, a homogeneous mixture can be obtained by mixing the three components and heating the mixture, however, it is preferable to dissolve them in an alcohol when a homogeneous mixture is not formed.

The alcohols can be the above-mentioned alcohols.

The order of the mixing of these three component is not critical and can be selected as desired.

A homogeneous mixture or alcohol solution can be obtained by mixing them and preferably heating at 100° C. to 160° C.

Then, a hydrocarbon is added to prepare the hydrocarbon solution. When an alcohol is used, it is preferable to remove the alcohol by a distillation etc.

In the process of the present invention, the hydrocarbon insoluble solid catalytic component is prepared by treating the hydrocarbon solution with an aluminum halide having the formula $$AlR^1X_2^1$$

($R^1$ is an alkyl, aryl or cycloalkyl group; and $X^1$ is a halogen atom).

In the formula, typical $R^1$ and $X^1$ are respectively the same with those of $R^2$ and $X^2$.

Suitable aluminum halides include ethylaluminum dichloride, methylaluminum dichloride, n-propylaluminum dichloride and n-butylaluminum dichloride.

The treatment with the aluminum halide can be carried out by adding an aluminum halide to the hydrocarbon solution to react them at room temperature to 100° C. preferably 60° C. to 100° C. especially 70° C. to 90° C. The hydrocarbon insoluble solid is separated and washed with hydrocarbon solvent.

An amounts of the components are dependent upon a desired physical property of a polyolefin and they are selected as desired.

For example, (i) a catalyst for preparing a polyolefin having a wide molecular weight direction and an improved processability can be obtained by selecting $X^1$, $X^2$, $X^3$, $X^4$, $OR^2$, $OR^3$, $OR^4$, Ti, Zr, and Mg in the formulas in gram equivalent ratios to give equations:

$$\gamma = \frac{X^1 + X^2 + X^3 + X^4}{OR^2 + OR^3 \ OR^4 + X^2 + X^3 + X^4} \leq 3$$

preferably
$$2 \leq \gamma \leq 2.9$$
$$0.5 \leq \frac{Zr}{Ti} \leq 1.2$$
preferably
$$0.5 \leq \frac{Zr}{Ti} \leq 1.0$$
$$0.25 \leq \frac{Ti}{Mg} \leq 1$$
preferably $0.35 \leq \frac{Ti}{Mg} \leq 0.55$ (ii) The catalyst for preparing a polyolefin having a wide molecular weight distribution and an improved processability, especially, in high activity of the catalyst, can be obtained by selecting them to give equations:

$$\gamma = \frac{X^1 + X^2 + X^3 + X^4}{OR^2 + OR^3 + OR^4 + X^2 + X^3 + X^4} > 3$$

preferably $3 < \gamma \leq 4$; $2.3 \leq \frac{Zr}{Ti} \times \gamma \leq 2.9$.

In the case of (ii), it is preferable to give the ratio of the titanium compound to the magnesium compound as a gram equivalent ratio of Ti/Mg of 0.3 to 0.7.

The cocatalyst of the organoaluminum compound is a compound having the formula $$AlR_k^5 X_{3-k}^5$$

($R^5$ is an alkyl, aryl or cycloalkyl group; $X^5$ is a halogen atom and k is 1 to 3).

In the formula, typical $R^5$ and $X^5$ respectively the same with those of $R^2$ and $X^2$.

Suitable organoaluminum compounds include trialkylaluminums such as triethylaluminum, tri-n-propylaluminum and triisobutylaluminum.

It is preferable to give a ratio of the organoaluminum compound to the hydrocarbon insoluble solid catalytic component as an atomic ratio of Al/(Ti+Zr) of 0.05 to 100 preferably 0.07 to 10.

The polymerization of an olefin is carried out in the presence of the resulting catalyst system.

Suitable olefins include α-olefins such as ethylene, propylene, butene-1, pentene-1 and octene-1. It is possible to copolymerize two or more olefins.

The process of the present invention is preferably applied for preparing ethylene homopolymer or ethylene copolymer having not more than 10 wt.% preferably not more than 5 wt.% of the other α-olefin.

The polymerization of an olefin can be a solution polymerization, a slurry polymerization in an inert solvent, or a gaseous polymerization in the absence of a solvent.

In usual, the polymerization is conducted in the presence of an inert solvent by feeding an olefin or an olefin mixture at suitable temperature and pressure.

Suitable inert solvents include aliphatic hydrocarbons such as pentane, hexane, heptane, octane, isooctane; alicyclic hydrocarbons such as cyclopentane, cyclohexane, and aromatic hydrocarbons such as benzene, toluene, etc.

The polymerization of an olefin is usually conducted at the temperature of the room temperature to 200° C. When the solid catalytic component prepared by the method (ii) is used, the polymerization is preferably conducted at 70° C. to 90° C. from the viewpoint of the activity of the catalyst and excellent properties of resulting polyolefin. The pressure in the polymerization is usually in a range of the atmospheric pressure to 100 atm.

When hydrogen is introduced into the polymerization zone, the effect for controlling the molecular weight by hydrogen is remarkably high to easily obtain the polymer having suitable molecular weight.

An amount of hydrogen is dependent upon the condition of polymerization and molecular weight of the object polyolefin and it should be selected depending upon these factors.

As described above, the advantage of the present invention is to use the catalyst having high catalytic activity and the other advantage of the present invention is to be able to control the molecular weight distribution to give excellent processability and no fisheye by selecting ratios of the magnesium compound, the titanium compound, the zirconium compound and the aluminum halide.

When ratios of these components are selected from the specific ranges, a polyolefin can be obtained in high efficiency of the catalyst under a normal condition of the polymerization without using a polymerization reactor having high pressure durability.

More particularly, when a molecular weight of the polyolefin especially polyethylene is high various advantages on strength can be given whereas a molten processability is inferior.

In accordance with the process of the present invention, a molten processability is high as more than 70 of the following flow ratio even though it has less than 0.1 of the following melt index.

The invention will further illustrated by certain Examples which are provided herein for purpose of illustration only and are not intended to be limiting in any manner unless otherwise specified.

In the Examples, the polymerization activity of the catalyst, K value was given as K=(g-polymer/g-catalyst×hr.×olefin pressure $Kg/cm^2$) and the melt index MI is measured by the method of ASTM D-1238-57T under a load of 2.16 Kg.

The molecular weight distribution is rated by the flow ratio (hereinafter referring to as FR) which corresponds to the shear stress dependency of melt viscosity which is shown by the ratio of melt indexes measured at shear stresses of $10^6$ dyne/$cm^2$ and $10^5$ dyne/$cm^2$ according to ASTM-D-1238-57T. When a flow ratio (FR) is high, a molecular weight distribution is wide whereas when it is low, a molecular weight distribution is narrow.

An extruding rate showing a processability is measured by extruding a sample through an extruder (a diameter of 19.1 mm; L/D=21, a compression ratio of 3; a full flight screw; a circular die having a diameter of 20 mm and a clearance of 0.5 mm; 21 D Uniaxial extruder manufactured by Brabender OHG.) at a die temperature of 200° C. at a revolution velocity of 150 rpm and showing as a unit of g/hr./rpm.

EXAMPLES 1 TO 11

(1) Preparation of Catalyst:

Diethoxymagnesium, tri-n-butoxytitanium monochloride and tri-n-butoxyzirconium monochloride were mixed at ratios shown in Table 1 and each mixture was stirred at 130° C. for 4 hours and was cooled to room temperature and 200 cc of benzene was added to prepare each homogeneous solution and then, ethylaluminum dichloride at the predetermined amount shown in Table 1 was added dropwise at 65° C. and each mixture was stirred at the temperature and time shown in Table 1. The resulting precipitate was washed with n-hexane and dried to obtain each catalyst powder.

(2) Polymerization of Ethylene:

In a 2 liter autoclave, 1,000 cc of n-hexane was charged and 20 mg of the catalyst powder was added. The autoclave was heated to the temperature shown in Table 1 and hydrogen was fed to give the predetermined pressure and triisobutylaluminum at the predetermined amount shown in Table 1 was fed together with ethylene to give a total pressure of 20 $Kg/cm^2$. A consumption of ethylene was resulted at the time feeding ethylene. Additional ethylene was fed to maintain a total pressure of 20 $Kg/cm^2$ and the polymerization was stopped by adding ethanol under the pressure after 1 hour. The results are shown in Table 1.

TABLE 1

| Example | Exp. 1 | Exp. 2 | Exp. 3 | Exp. 4 | Exp. 5 | Exp. 6 | Exp. 7 | Exp. 8 | Exp. 9 | Exp. 10 | Exp. 11 |
|---|---|---|---|---|---|---|---|---|---|---|---|
| Amount (m mole) | | | | | | | | | | | |
| Mg compound | 18 | 18 | 18 | 20 | 20 | 20 | 22 | 22 | 22 | 22 | 22 |
| Ti compound | 10 | 10 | 10 | 10 | 10 | 10 | 10 | 10 | 10 | 10 | 10 |
| Zr compound | 7.5 | 7.5 | 7.5 | 9.0 | 9.0 | 9.0 | 9.5 | 7.5 | 7.5 | 7.5 | 7.5 |
| EADC *1) | 194 | 194 | 166 | 170 | 170 | 170 | 179 | 174 | 174 | 174 | 174 |
| Condition treating with EADC *1) (°C.-hr.) | 80-1 | 80-1 | 80-1 | 80-2 | 80-2 | 80-2 | 80-2 | 80-1 | 80-1 | 80-1 | 90-1 |
| γ *2) | 3.8 | 3.8 | 3.3 | 3.1 | 3.1 | 3.1 | 3.1 | 3.9 | 3.9 | 3.2 | 3.9 |
| Zr/Ti × γ | 2.9 | 2.9 | 2.5 | 2.8 | 2.8 | 2.8 | 2.9 | 2.9 | 2.9 | 2.4 | 2.9 |
| Ti/Mg | 0.55 | 0.55 | 0.55 | 0.50 | 0.50 | 0.50 | 0.45 | 0.45 | 0.45 | 0.45 | 0.45 |
| Polymerization Temp. (°C.) | 70 | 75 | 70 | 75 | 80 | 85 | 80 | 70 | 75 | 70 | 75 |
| TIBA *3) (m mole) | 0.8 | 0.08 | 0.8 | 0.8 | 0.08 | 0.04 | 0.08 | 0.8 | 0.08 | 0.8 | 0.08 |
| $H_2$ ($Kg/cm^2$) | 12.3 | 12.0 | 12.1 | 12.2 | 12.0 | 11.6 | 10.7 | 10.6 | 10.3 | 10.4 | 10.6 |

TABLE 1-continued

| Example | Exp. 1 | Exp. 2 | Exp. 3 | Exp. 4 | Exp. 5 | Exp. 6 | Exp. 7 | Exp. 8 | Exp. 9 | Exp. 10 | Exp. 11 |
|---|---|---|---|---|---|---|---|---|---|---|---|
| Yield of polymer (g) | 311 | 345 | 340 | 301 | 319 | 462 | 390 | 420 | 472 | 474 | 450 |
| Catalyst efficiency (g/g) | 15,000 | 17,200 | 17,000 | 15,050 | 16,000 | 23,100 | 19,500 | 21,000 | 23,600 | 23,700 | 22,500 |
| K | 2,070 | 2,240 | 2,210 | 2,010 | 2,100 | 2,920 | 2,190 | 2,280 | 2,510 | 2,520 | 2,470 |
| MI | 0.06 | 0.06 | 0.06 | 0.07 | 0.07 | 0.08 | 0.07 | 0.06 | 0.06 | 0.06 | 0.06 |
| FR | 78 | 75 | 83 | 73 | 67 | 69 | 67 | 77 | 70 | 76 | 71 |
| Extruding rate (g/hr./r.p.m.) | 15.6 | 15.0 | 15.0 | 15.6 | 14.0 | 15.0 | 14.0 | 15.5 | 15.2 | 15.1 | 15.4 |

Note:
*1) EADC: $(C_2H_5)AlCl_2$

*2) $\gamma = \dfrac{X^1 + X^2 + X^3 + X^4}{OR^2 + OR^3 + OR^4 + X^2 + X^3 + X^4}$

*3) TIBA: $(iC_4H_9)_3Al$

What is claimed is:

1. In a process for polymerizing an olefin in the presence of a catalyst system combining an organoaluminum compound with a hydrocarbon insoluble solid catalytic component prepared by treating a hydrocarbon solution containing a magnesium compound, a titanium compound and a zirconium compound with an aluminum halide having the formula $AlR^1X_2^1$, wherein $R^1$ represents an alkyl, aryl or cycloalkyl group and $X^1$ represents a halogen atom, the improvement wherein the magnesium compound is a compound having the formula $$Mg(OR^2)_2$$

wherein $R^2$ represents an alkyl, aryl or cycloalkyl group; and the titanium compound is a compound having the formula $$Ti(OR^3)_3X^3$$

wherein $R^3$ represents an alkyl, aryl or cycloalkyl group; and the zirconium compound is a compound having the formula $$Zr(OR^4)_mX_{4-m}^4$$

wherein $R^4$ represents an alkyl, aryl or cycloalkyl group; $X^4$ represents a halogen atom; m is 1, 2 or 3 or an alcohol solution of a compound having the formula $$ZrX_4^4$$

$X^3 = X^4 = Cl$; and wherein $$\gamma = \dfrac{X^{11} + X^3 + X^4}{OR^2 + OR^3 + OR^4 + X^3 + X^4} > 3 \text{ and}$$

$$2.3 \leq \dfrac{Zr}{Ti} \times \gamma \leq 2.9$$

2. A process for polymerizing an olefin according to claim 1, wherein the zirconium compound is a compound having the formula $$Zr(OR^4)_3X^4.$$

3. A process for polymerizing an olefin according to claim 1, wherein the zirconium compound is an alcohol solution of a compound having the formula $$ZrX_4^4$$

4. A process for polymerizing an olefin according to claim 2, wherein the zirconium compound is tri-n-butoxyzirconium monochloride.

5. A process for polymerizing an olefin according to claim 3, wherein the zirconium compound is a n-butanol solution of zirconium tetrachloride.

6. A process for polymerizing an olefin according to claim 1, wherein the magnesium compound is diethoxymagnesium and the titanium compound is tri-n-butoxytitanium monochloride.

7. A process for polymerizing an olefin according to claim 1, wherein the aluminum halide is ethylaluminum dichloride.

8. A process for polymerizing an olefin according to claim 1, wherein the magnesium compound, the titanium compound and the zirconium compound are mixed with an alcohol to form a homogeneous solution and then, the alcohol is removed and a hydrocarbon solvent is added to prepare a hydrocarbon solution.

9. A process for polymerizing an olefin according to claim 8, wherein the alcohol is n-butanol.

10. A process for polymerizing an olefin according to claim 8, wherein the magnesium compound, the titanium compound and the zirconium compound are mixed with an alcohol at 100° C. to 160° C. to form a homogeneous solution.

11. A process for polymerizing an olefin according to claim 1, wherein the hydrocarbon solvent for the hydrocarbon solution is benzene, toluene or xylene.

12. A process for polymerizing an olefin according to claim 1, wherein the temperature for treating with the aluminum halide is at 60° C. to 100° C.

13. A process for polymerizing an olefin according to claim 1, wherein the organoaluminum compound is a compound having the formula $$AlR_k^5X_{3-k}^5$$

wherein $R^5$ represents an alkyl, aryl or cycloalkyl group; $X^5$ represents a halogen atom; k is 1 to 3.

14. A process for polymerizing an olefin according to claim 15, wherein the organoaluminum is triisobutylaluminum.

15. A process for polymerizing an olefin according to claim 1, wherein the polymerization temperature is in a range of 70° C. to 90° C.

16. A process for polymerizing an olefin according to claim 1, wherein the amount of the magnesium compound and the titanium compound in gram equivalent ratio is in a range of 0.3 to 0.7.

17. A process for polymerizing an olefin according to claim 1, wherein the magnesium compound, the titanium compound, the zirconium compound and the aluminum halide are respectively $Mg(OR^2)_2$, $Ti(OR^3)_3Cl$, $Zr(OR^4)_3Cl$ and $AlR^1Cl_2$ and the treatment with the aluminum halide is performed at 70° C. to 100° C.

* * * * *